United States Patent [19]

Erkfritz

[11] 4,315,706
[45] Feb. 16, 1982

[54] HOLDER ASSEMBLY FOR AN INDEXABLE INSERT FOR USE IN A CUTTING TOOL

[75] Inventor: Donald S. Erkfritz, Clarkston, Mich.

[73] Assignee: General Electric Company, Columbus, Ohio

[21] Appl. No.: 137,998

[22] Filed: Apr. 7, 1980

[51] Int. Cl.³ .......................... B26D 1/12; B26D 1/00
[52] U.S. Cl. ..................................... 407/101; 407/113
[58] Field of Search ............... 407/101, 102, 103, 104, 407/105, 113, 114

[56] References Cited

U.S. PATENT DOCUMENTS

| | | | |
|---|---|---|---|
| 1,460,030 | 6/1923 | Mattson | 407/113 |
| 2,289,344 | 7/1942 | Cedarleaf | 407/113 |
| 2,877,535 | 3/1959 | Williams | 407/103 |
| 3,121,939 | 2/1964 | Williams | 407/103 |
| 3,376,763 | 4/1968 | Welles | 407/103 |
| 3,629,919 | 12/1971 | Trevarrow, Jr. | 407/113 |
| 3,927,447 | 12/1975 | Willinger | 407/113 |
| 4,077,735 | 4/1978 | Dick et al. | 407/113 |
| 4,083,644 | 4/1978 | Friedline | 407/113 |
| 4,189,264 | 2/1980 | Kraemer | 407/114 |
| 4,209,047 | 6/1980 | Weill | 407/103 |

FOREIGN PATENT DOCUMENTS 634855  11/1978  U.S.S.R. ......................... 407/103

Primary Examiner—Harrison L. Hinson
Attorney, Agent, or Firm—Hedman, Casella, Gibson & Costigan

[57] ABSTRACT

For use with an indexable metal cutting tool, an improved holder assembly is disclosed which functions to maintain the position of an indexable insert during operation of the tool. More particularly, a holder assembly is described which includes a support member, connected to the cutter body of the tool, which includes a platform and a threaded aperture disposed normal to the plane of the platform. The latter includes a plurality of keys extending from the plane of the platform. A planar indexable insert having an aperture disposed normal to the planar surfaces thereof is disposed in abutting relationship with the platform of the support member, such that the apertures therein are in register. In addition, the planar surface of the indexable insert which is in abutting relationship with the platform includes receiving grooves which are adapted to be interengaged with the keys of the support member. The indexable insert is maintained in abutting relationship with the platform by a screw which extends through the registered apertures and is threadably engaged in said support member. The interengagement between the keys and the grooves of the support member and insert function to restrict unwanted rotational movement of the insert about the axis of the screw during use of the cutter.

5 Claims, 6 Drawing Figures

HOLDER ASSEMBLY FOR AN INDEXABLE INSERT FOR USE IN A CUTTING TOOL

This invention relates to a holder assembly for an indexable insert for use in a metal cutting tool. More particularly, a holder assembly is disclosed having a support member connected to the cutter body, and including a platform having interlocking key members extending therefrom. A planar indexable insert is provided with receiving grooves for interengaging the keys of the support member. A screw connects the indexable insert to the support member through a pair of registered apertures therein. The interlocking key and groove arrangement functions to inhibit undesirable rotation of the insert about the axis of the screw during use of the cutting tool.

BACKGROUND OF THE INVENTION

Cutting tools in the prior art, such as end mill cutting tools or rotatable milling tools, have been provided with indexable inserts to substantially increase the utility of the tool. More specifically, prior to the use of indexable inserts, the replaceable blades employed had only a single sharpened edge. To reduce manufacturing costs, an indexable insert, formed from tungsten carbide material, was developed having a plurality of sharpened cutting edges. In use, when a cutting edge beomes dull, the indexable insert is merely rotated such that a fresh sharpened edge is positioned to extend outwardly from the cutter in an active cutting position.

To maximize the number of cutting edges on a single insert, it is preferable that the insert be symmetrical in configuration to permit indexing annd mounting of the insert in a variety of orientations. Thus, the prior art inserts may be square, circular, triangular, pentagonal, hexagonal or octagonal (multi-faceted) in configuration so as to be readily indexed and mounted to expose a fresh sharpened cutting edge.

The cutter bodies which were adapted to receive the indexable inserts of the prior art are generally provided with pockets adapted to receive the inserts, which include a platform area and one or more side walls. The indexable insert is inserted in one of the pockets and is oriented such that one of the planar surfaces thereof abuts the platform surface of the pocket of the cutter body. In addition, the side walls of the pocket are adapted to abut and brace one or more of the inactive sides of the insert. By this arrangement, the side walls prevent the insert from rotating about its central axis during the use of the cutting tool. Preventing shifting or rotating of the insert during use is required such that desired axial and radial rake angle, as well as the lead angle of the cutting edge is maintained.

As can be appreciated, the tooling or machining of the insert pockets in a tool body is difficult and time consuming and thus, relatively expensive. The side walls of the pocket must be formed with relatively high structural rigidity to prevent the breakdown of the cutter during operation. In addition, the number of pockets which may be formed in a cutting tool of a given size is limited and thus, the number of inserts which may be placed around the circumference of the tool is correspondingly limited.

Accordingly, it is an object of the subject invention to provide an improved holder assembly for an indexable insert which functions to restrict the unwanted rotational movement of the insert during the operation of the cutter.

It is another object of the subject invention to provide a new and improved holder assembly for an indexable insert which eliminates the need for side walls of a receiving pocket.

It is a further object of the subject invention to provide a holder assembly for an indexable insert which will allow the mounting of two or more inserts in close proximity, since the need for the side walls of the pocket are eliminated. By this arrangement, the number of inserts which may be mounted on a tool of a given size is increased.

DESCRIPTION OF THE INVENTION

In accordance with the subject invention, there is provided a holder assembly for an indexable insert for use in conjunction with a cutting tool. The holder assembly includes a support member which is connected to the cutting tool and includes a platform portion. The support member further includes a threaded aperture which is disposed normal to the plane of the platform. The platform portion is provided with a first interlocking means for engagement with the indexable insert. In the preferred embodiments of the subject invention, the first interlocking means consists of at least one key member which extends from the platform of the support member.

The holder assembly further includes a generally planar indexable insert having a central aperture disposed therein which is perpendicular to the planar surfaces of the insert. The planar insert is mounted on the support member such that one of the planar surfaces thereof is in abutting relationship with the platform portion of the support member with the apertures therein being in register. The planar surface of the indexable insert which is in abutting relationship with the platform portion of the support member includes a second interlocking means adapted to be interengaged with the first interlocking means of the support member. In the preferred embodiments, the second interlocking means includes at least one receiving groove which is adapted to be interengaged with the key members of the support member.

The indexable insert is maintained in abutting relationship with the platform of the support member by a screw which extends through registered apertures therein and is threadably engaged with the aperture in the support member, and by this arrangement, the first and second interlocking means remain interengaged. The interengagement between the keys and groove functions to restrict unwanted rotational movement of the insert about its central axis during the operation of the cutting tool. Thus, the desirable axial and radial rakes and lead angles of the insert may be maintained during the operation of the cutting tool without the need for side wall locators in the cutting tool pocket. To index the insert, the user has merely to loosen the screw and rotate the insert. By retightening the screw, the interlocking means will become interengaged preventing the unwanted rotation of the insert during use of the tool. In addition to reducing manufacturing costs by eliminating the need for side walls in the pockets, the subject invention may be utilized to permit the mounting of a plurality of indexable inserts in close proximity. More specifically, since the requirements of side wall structures are eliminated, a plurality of indexable inserts may be mounted in close proximity to increase the effectiveness of the cutting tool.

DESCRIPTION OF THE PREFERRED EMBODIMENTS

Figure 1:
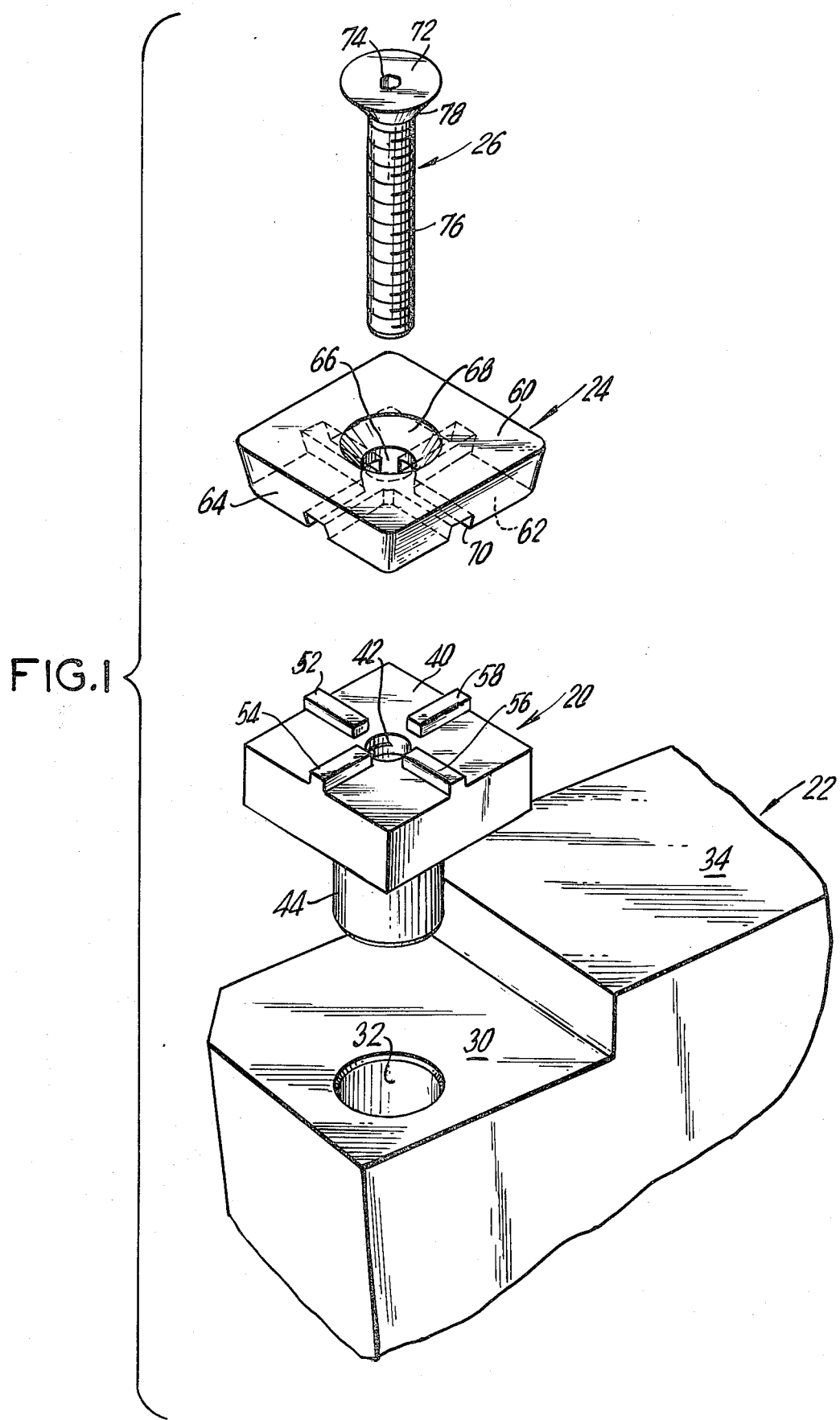
FIG. 1 is an exploded view in perspective of a first embodiment of the holder assembly of the subject invention.
Figure 2:
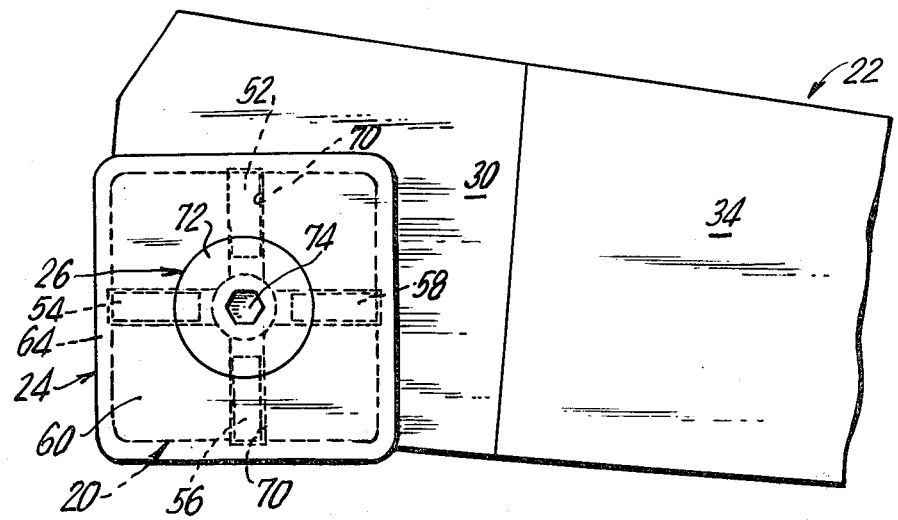
FIG. 2 is a plan view of the first embodiment of the holder assembly of the subject invention.
Figure 3:
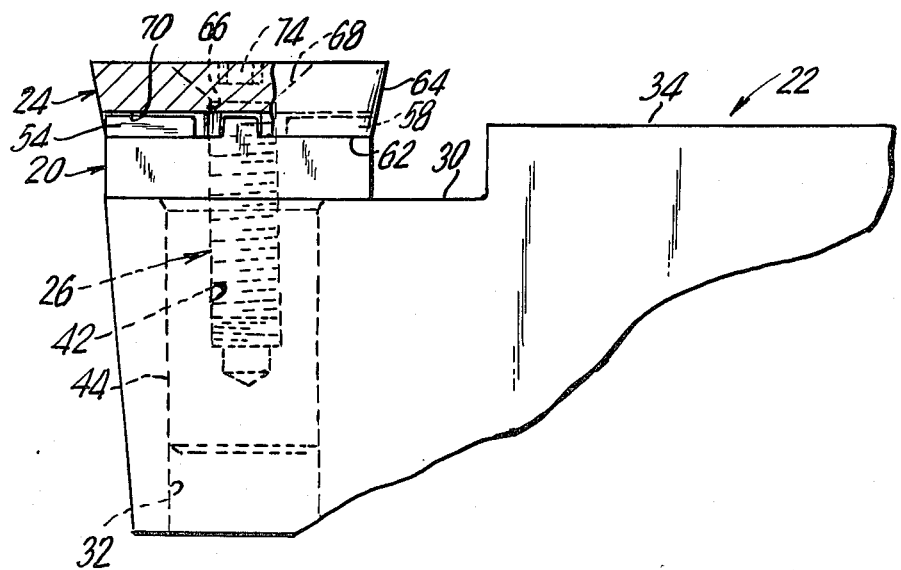
FIG. 3 is a side elevational view of the first embodiment of the holder assembly of the subject invention.

Referring now more specifically to FIGS. 1-3, a first embodiment of the holder assembly of the subject invention to illustrated. Generally, the holder assembly consists of a support member 20 which is adapted to be connected to a tool body 22. The support member 20 is intended to be interengaged with a generally square, planar indexable insert 24. A screw 26 is provided for fastening the indexable insert 24 to the support member 20.

Turning now more specifically to the tool body 22, a generally planar pocket area 30 is provided having a hole 32 therein to allow for the connection of the support member 20 to the tool body 22. The pocket area 30 is undercut from the surface 34 of the cutting tool to provide the desired clearance angle for the cutting edge of the indexable insert 24. While the subject invention is shown used in conjunction with a block style cutting tool, it may readily be adapted for use with a generally circular milling cutter that rotates about a predetermined axis.

The support member 20 generally matches the configuration of the insert 24, that is, square in the subject embodiment and includes a planar platform area 40 and a threaded central aperture 42 disposed normal to the plane of the platform. A cylindrical connector 44 is provided which extends downwardly from the side of the support member opposed to the platform 40. The diameter of the cylindrical connector 44 is substantially equal to the diameter of the aperture 32 provided in the cutter body. By this arrangement, the interconnection between the support member and the tool holder or cutter body 30 may be achieved by press fitting the cylindrical connector 44 into aperture 32 of the tool body 22. The connection of the support member 20 to the tool body 22 may be achieved through various other mechanical expedients, for example, a screw extending through both the tool body 22 and the cylindrical connector 44 in a direction perpendicular to the longitudinal axis of the cylindrical connector 44. In the alternative, the support member 20 can be formed integrally with the tool body 22. However, it is apparent that the mounting method used must function to prevent the support member 20 from rotating relative to the tool body 22.

In the first embodiment of the subject invention, the interlocking means of the support member 20 consists of a plurality of generally rectangular keys 52, 54, 56, 58 which extend upwardly from the planar platform 40, and are formed integrally with the support member 20. In the illustrated embodiment of the holder assembly, the rectangular keys are paired, with the longitudinal axis of the first pair of rectangular keys 52, 56 extending along a first line, and the longitudinal axis of the second pair of rectangular keys 54, 58 extending along a second line, which is perpendicular to the first line. The rectangular keys are thus disposed in a generally cross-like symmetrical configuration, surrounding the central aperture 42 and extending to the side edges of the support member 20. The rectangular keys of the support member 20 are adapted to be interengaged with receiving grooves formed in the indexable insert, as more fully described hereinafter.

As illustrated in FIG. 1, the indexable insert 24 is provided with a generally planar, square configuration. The overall configuration of the insert 24 is that of a conventional positive insert wherein the dimensions of upper square surface 60 are slightly greater then the dimensions of the lower square surface 62. By this arrangement, the rake faces 64 of the insert are angled to improve the cutting ability of the insert. A central aperture 66 is provided which is disposed normal to the planar surfaces 60, 62 of the insert 24. The aperture 66 is formed with a generally frusto-conical portion 68 adjacent the upper planar surface 60, which is adapted to receive screw 26.

In accordance with the subject invention, a standard insert 24 is modified by forming a second interlocking means on the lower planar surface 62 thereof. In the illustrated embodiment, the second interlocking means includes a generally cross-shaped receiving groove 70 having dimensions sufficient to receive the rectangular keys 52-56. As illustrated in FIGS. 2 and 3, the receiving groove 70 interfits with the key members 52-56, thereby locking the insert and preventing it from rotational movement about the central aperture 66.

The lower surface 62 of the insert 24 is maintained in abutting relationship with the platform 40 of the support member 20 by screw 26. The latter extends through the aperture 66 in insert 24 and is threadably engaged within threaded aperture 42. Screw 26 consists of a flattened top portion 72 having a hexagonal central indentation 74 to allow for the tightening of the screw 26 by a suitable wrench or driver. The shaft portion 76 of the screw is generally cylindrical in configuration while the head portion 78 of the screw 26, between the shaft 76 and the flattened top portion 72, is generally frusto-conical in configuration. By this arrangement, when the screw is tightened into the threaded aperture 42, the frusto-conical head portion 78 coacts with the frusto-conical area 68 of hole 66 in insert 24 in a wedge-like manner, such that the insert is properly seated on support member 20. More specifically, any initial misalignment prior to the insertion of the screw will be corrected as the screw is tightened. As illustrated in FIG. 3, it is preferred that the screw 26 be tightened until the flattened top 72 is coplanar with the upper surface 60 of the insert 24. In this embodiment of the subject invention, cylindrical connector 44 is of sufficient length to receive the entire shaft of the screw which extends below the insert 24. After tightening the screw 26, the insert 24 will be securely locked in abutting relation with the platform 40 of the support member 20. Further, the keys of the support member are interfit and engaged with the receiving groove 70 of the insert 24. The secure interengagement functions to prevent the rotational shifting of the insert during the operation of the tool.

To index the insert, screw 26 is loosened an amount sufficient to disengage the interlocking keys and groove to permit the rotation of the insert. The screw 26 is then retightened to interengage the opposed interlocking key members 52-58 and receiving groove 70. Preferably, the key members 52-58 and the groove 70, are symmetrical in configuration to permit the complete interengagement therebetween in each different orientation. Of course, when the insert being employed is not intended to be indexed, the interlocking means need only be matched, rather than symmetrically formed.

Figure 4:
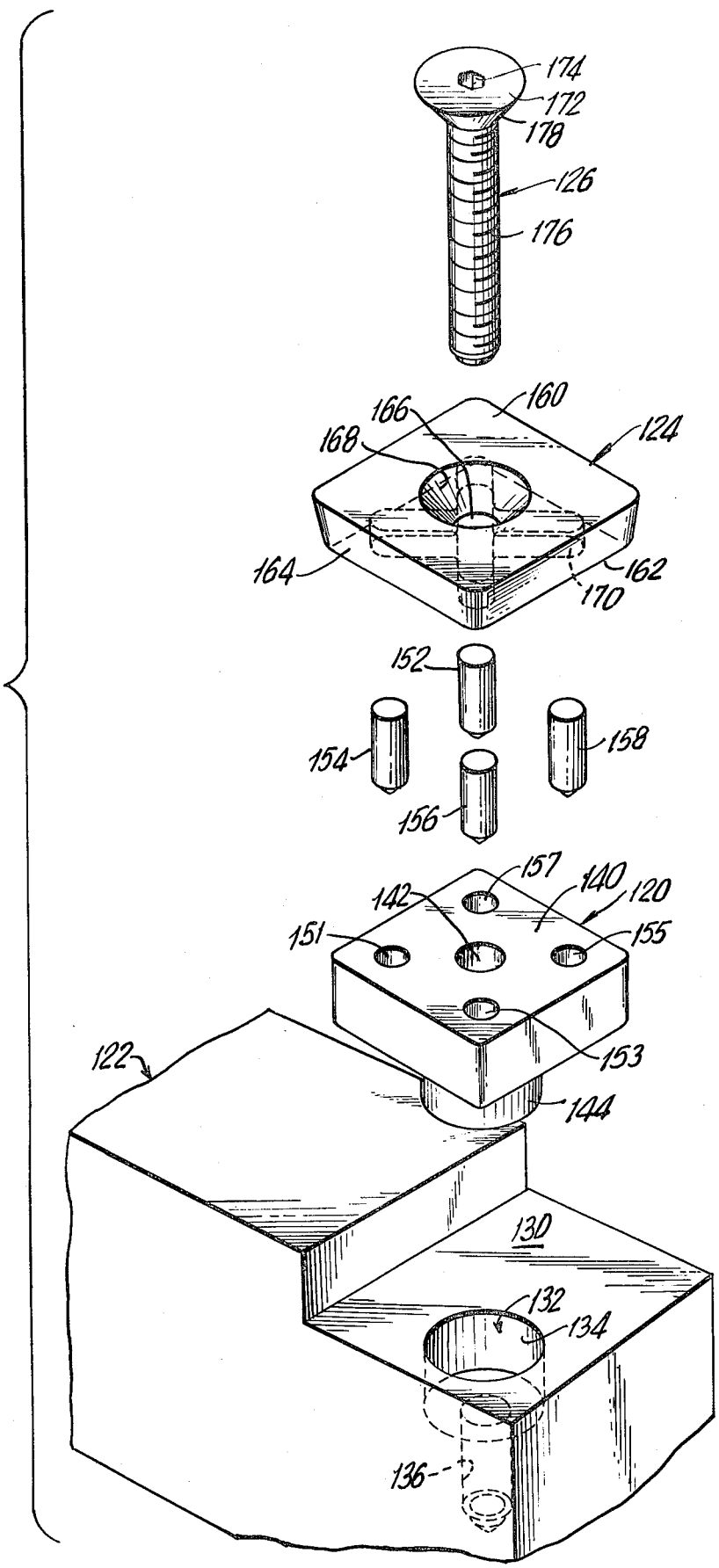
FIG. 4 is an exploded perspective view of the second embodiment of the holder assembly of the subject invention.
Figure 5:
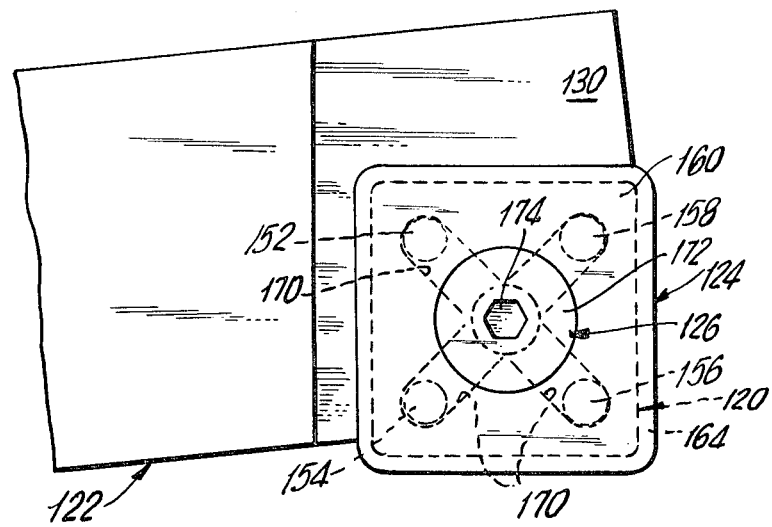
FIG. 5 is a plan view of the second embodiment of the holder assembly of the subject invention.
Figure 6:
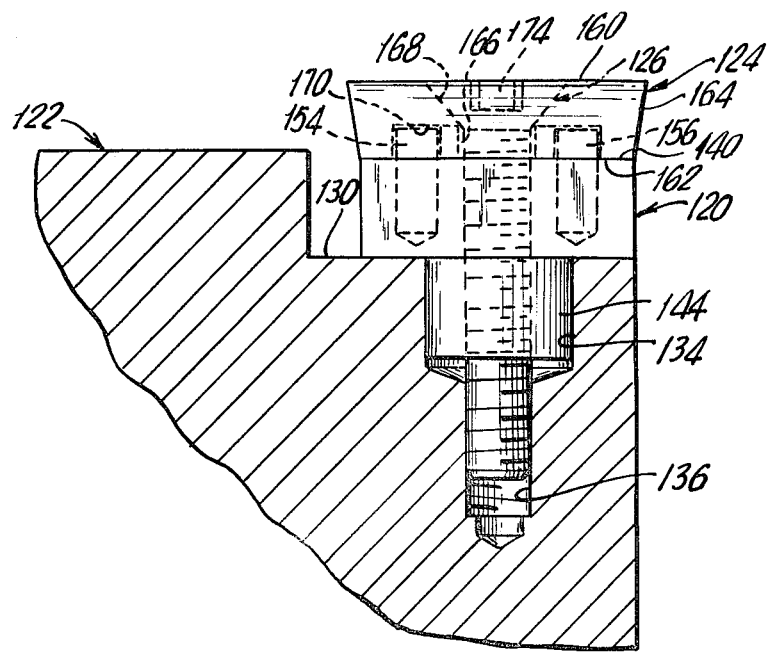
FIG. 6 is a side elevational view, partially in section, of the second embodiment of the holder assembly of the subject invention.

Turning now to FIGS. 4-6, the second embodiment of the holder assembly of the subject invention is illustrated and includes a support member 120 adapted to be connected to a tool body 122. As indexable insert 124 is provided, as well as a screw 126 having substantially the same configuration as the screw 26 in the first embodiment of the subject invention.

Turning more specifically to the tool body 122, a planar pocket area 130 is provided having a configuration which aids in regulating the orientation of the insert 124 relative to the tool body 122. A hole 132 is provided in the pocket area 130 which includes a large diameter portion 134 and a smaller centrally located threaded aperture portion 136. The threaded aperture portion 136, is adapted to receive the end of screw 126, thereby providing an alternate means for connecting to holder assembly, as more fully described hereinafter.

Support member 120, which matches the insert shape, in this embodiment is square in configuration and includes a planar platform area 140 and a central clearance aperture 142. A cylindrical connector 144 is provided on the lower surface of the support member 120, and has a diameter substantially equal to the larger diameter portion 134 of hole 132 in tool body 122. Cylindrical connector 144 is shorter in length than the cylindrical connector 44 of the first embodiment of the subject invention. The support member 120 is connected to the tool body 122 by press fitting cylindrical connector 144 in the large diameter portion 134 of hole 132. The clearance aperture 142 in support member 120 is thereby disposed in register with the threaded aperture portion 136 of hole 132. By this arrangement, the portion of the screw 126 which extends below the cylindrical connector 144 engages threaded aperture 136 provided in the tool body 122.

In the second embodiment of the subject invention, support member 120 is provided with an alternative form of interlocking means, and more specifically, is provided with four symmetrically arranged, cylindrical key members 152, 154, 156, 158 which extend from the platform area 140. While the cylindrical key members 152-158 are illustrated as separate units in the exploded view of FIG. 4, they are preferably formed integrally with the support member 120 in a manner similar to that illustrated in the first embodiment of the subject invention. In the alternative, four holes 151, 153, 155, 157 may be provided adjacent the corners of the generally square platform 140 which are adapted to receive cylindrical key members 152, 154, 156, 158. The key members 152-158 may be press fit in holes 151-157 to provide for a stable mounting. As illustrated in FIG. 6, the cylindrical key members 152-158 preferably extend perpendicularly from the platform surface a sufficient distance to provide a secure interlock with the insert 124.

Insert 124 has a configuration similar to a standard industry insert and includes an upper planar surface 160 and a lower plant surface 162 of slightly smaller dimensions, thereby defining inclined side rake surfaces 164. A central aperture 166 is provided having a frusto-conical portion 168 adjacent the upper surface 160. In accordance with the subject invention, a second interlocking means is provided on the lower surface of the insert 124 and consists of a symmetrically disposed cross-shaped receiving groove 170. Receiving groove 170 is adapted to interengage with the cylindrical keys 152-158 of the support member 120. In the second embodiment of the subject invention, and as illustrated in FIGS. 4 and 5, the receiving groove 170 terminates short of the edges or faces 164 of the insert. Preferably, key members 152-158 are disposed to interengage with the outermost portions of the receiving groove 170 as most clearly illustrated in FIG. 5. By positioning the cylindrical key members 152-158 in the above described manner, maximum resistance to the rotational movement of the insert may be achieved.

Similar to the first embodiment, the lower surface 162 of the insert 124 is maintained in abutting relationship with the support member 120 by means of screw 126. Screw 126 includes a flattened top surface 172 and a hexagonal indentation 174. The shaft 176 of the screw is generally cylindrical in configuration and the head portion 178 is frusto-conical in configuration. As in the first embodiment, the frusto-conical head 179 coacts with the frusto-conical opening 168 of aperture 166, in a wedge-like manner, during the tightening of the screw 126 to properly seat the insert 124. The screw 126 extends through aperture 166 as well as through the clearance aperture 142 of the support member, and beyond cylindrical connector 144 and is threadably engaged with threaded aperture 136. As in the first embodiment, the insert 124 may be indexed simply by loosening the screw 126 and rotating the insert 124 to expose a new cutting edge. Thereafter, the screw 126 is retightened to lock the insert 124 and prevent any unwanted rotational movement.

Accordingly, there is provided a new and improved holder assembly for an indexable, metal cutting tool. The holder assembly consists of a support member which is connected to the cutting tool and includes an upper platform surface and a central threaded aperture disposed normal to the plane of the platform. The platform includes a first interlocking means which in the preferred embodiments consists of a plurality of symmetrically arranged upstanding key members. A generally planar indexable insert having a central aperture therein is disposed in abutting relationship with the platform of the support member. The planar surface of the insert which is abutting the platform surface of the support member includes a second interlocking means which, in the preferred embodiment, consists of a symmetrically arranged receiving groove capable of interengagement with the upstanding key members of the support member. A screw is provided which extends through and is threadably engaged with the apertures in the holder assembly. The screw functions to maintain the indexable insert in abutting relationship with the platform of the support member, whereby the interlocking means remain interengaged thereby restricting the unwanted rotational movement of the insert during the use of the cutting tool. The above described holder assembly functions to maintain the insert in the desired orientation without the necessity of providing side wall retaining means in an insert pocket of a tool body. By this arrangement, cutting tools may be produced at a substantially reduced cost and in addition, a plurality of inserts may be placed in a cutting tool in close proximity, since the need for complex pocket arrangements has been eliminated.

It is to be understood that changes may be made in the particular embodiments of the invention in light of the above teachings, but that they will fall within the scope and spirit of the subject invention as defined by the appended claims. For example, although the invention has been described with reference to inserts of generally square configuration, the invention may also be embodied in systems wherein the inserts are of triangular, pentagonal, circular, hexagonal or octagonal configuration, and wherein the inserts may be of a negative or positive rake along the edges thereof. Still further, the interlocking means in the form of the grooves and key members may be provided on one or both of the opposed planar surfaces of the insert when the latter is of a negative rake configuration.

I claim:

1. In a metal cutting tool having an elongated body, a holder assembly including a cutting insert, said holder assembly comprising:
   a support member secured to said cutting tool, said support member including a platform and having a central aperture disposed normal to the plane of said platform, said platform including a first interlocking means comprising four longitudinally extending keys, each having a generally cylindrical configuration;
   a generally planar cutting insert having a central aperture disposed normal to the planer surfaces thereof, with one planar surface of said insert disposed in abutting relationship with said platform of said support member such that said apertures are in register, and with the planar surface of said insert which is abutting said platform further including a second interlocking means, said second interlocking means being interengaged with said first interlocking means of said platform, said second interlocking means comprising a receiving groove which is cross-shaped in cross section, said keys and receiving groove being symmetrically arranged such that said insert may be indexed; and
   screw means extending through said apertures for holding said cutting insert in abutting relationship with said platform of said support member, whereby said first and second interlocking means remain interengaged and function to restrict the unwanted rotational movement of said insert about the axis of said screw means during use of the cutting tool.

2. A cutting tool as recited in claim 1 wherein said keys are formed integrally with said support member.

3. A cutting tool as recited in claim 1 wherein said screw includes a frusto-conical head portion, and wherein the central aperture of said insert includes a frusto-conical portion, adjacent the other planar surface of said insert, which coacts with the frusto-conical head portion of said screw to facilitate the accurate seating of said insert on said platform.

4. A cutting tool as recited in claim 1 wherein said support member further includes a cylindrical connector disposed on the side of said support member opposed to said platform, said cylindrical member being receivable in a cylindrical aperture in said cutting tool for connecting said support member to said cutting tool.

5. A cutting tool as recited in claim 4 wherein said means for holding said insert in abutting relationship with said platform of said support member is a screw and wherein said cylindrical aperture in said cutting tool includes a large diameter portion adapted to receive said cylindrical connector of said support member, said cylindrical aperture further including a threaded smaller diamter portion disposed in register with said central aperture of said support member, such that a portion of said screw may be threadably engaged therein.

* * * * *